United States Patent [19]
Waugh et al.

[11] Patent Number: 5,400,363
[45] Date of Patent: Mar. 21, 1995

[54] QUADRATURE COMPENSATION FOR ORTHOGONAL SIGNAL CHANNELS

[75] Inventors: Geoffrey S. Waugh, Belmont; Gary L. Wagner, Menlo Park; Michael E. Jacobson, San Jose, all of Calif.

[73] Assignee: Loral Aerospace Corp., New York, N.Y.

[21] Appl. No.: 60,209

[22] Filed: May 7, 1993

[51] Int. Cl.[6] .................... H04L 27/14; H04L 27/16; H04L 27/22
[52] U.S. Cl. ...................................... 375/80; 375/97; 329/308; 331/12
[58] Field of Search ........................ 375/80, 81, 83, 97, 375/78, 88, 120; 329/307, 308, 309; 331/10, 12, 34

[56] References Cited

U.S. PATENT DOCUMENTS

| | | | |
|---|---|---|---|
| 4,085,378 | 4/1978 | Ryan et al. | 329/124 |
| 4,092,606 | 5/1978 | Ryan | 329/124 |
| 4,308,503 | 12/1981 | Scott | 329/50 |
| 4,317,217 | 2/1982 | Davidson et al. | 455/24 |
| 4,336,500 | 6/1982 | Attwood | 329/50 |
| 4,344,178 | 8/1982 | Waters | 375/81 |
| 4,379,266 | 4/1983 | Rubin | 375/80 |
| 4,581,586 | 4/1986 | Rubin | 329/50 |
| 4,953,182 | 8/1990 | Chung | 375/97 |
| 5,134,634 | 7/1992 | Yashida | 375/80 |
| 5,138,272 | 8/1992 | Le Polozec et al. | 329/308 |
| 5,157,694 | 10/1992 | Iwasaki et al. | 375/81 |

Primary Examiner—Stephen Chin
Assistant Examiner—Amanda T. Le
Attorney, Agent, or Firm—Perman & Green

[57] ABSTRACT

A system for processing inphase and quadrature data channels, such as a Costas loop QPSK demodulator, employs an additional feedback loop for adjustment of phase offset between carrier reference signals, this loop being in addition to the Costas error loop for control of frequency and phase of an oscillator which provides the regenerated carrier signal. The additional loop employs cross-channel products of demodulated inphase and quadrature data signals as does the Costas loop. The regenerated carrier is applied via an adjustable phase-offset unit to provide quadrature carrier reference signals to phase detectors of inphase and quadrature data channels. The phase offset unit includes a 90 degree hybrid circuit energized by the carrier signal at a main input port plus an adjustable fraction of the carrier power applied to an auxiliary input port. Adjustment of the relative magnitudes of the signals at the two input ports of the hybrid circuit in accordance with the sum of the cross-channel products provides a desired amount of phase offset between the two carrier reference signals in correspondence with the deviation from orthogonality of the components of the composite input signal. This removes crosstalk resulting from the deviation in orthogonality of the components of the composite input signal.

5 Claims, 1 Drawing Sheet

QUADRATURE COMPENSATION FOR ORTHOGONAL SIGNAL CHANNELS

BACKGROUND OF THE INVENTION

The invention disclosed herein is a "subject invention" under NASA Contract. NAS5-33000, Subcontract No. F14000-J19513.

This invention relates to a signal processing system employing orthogonal signal channels with carrier regeneration, such as a QPSK (quadrature phase shift keying) demodulator, operative with an input data signal which is a composite of two orthogonal signal components, the demodulator having inphase and quadrature channels for extraction of inphase and quadrature components of the data. More particularly, the invention relates to a QPSK demodulator having a variable phase offset circuit at an output of an oscillator for adjusting a phase difference between reference carrier components to the two channels to compensate for a deviation in orthogonality of the components of the input data signal.

The Costas loop is a well-known form of a demodulator for reception of a QPSK signal. A basic form of the Costas loop is shown in FIG. 1 of Waters, U.S. Pat. No. 4,344,178. A mathematical description of an input composite signal having inphase and quadrature components is disclosed in Col. 1 of Ryan, U.S. Pat. No. 4,092,606. The incoming QPSK signal, to be processed by the demodulator, is composed of two orthogonal components, namely, an inphase (I) component and a quadrature (Q) component. Mathematically, the two signals may be represented as two sinusoidal waveforms wherein one of the waveforms is a sinusoid and the other is a cosinusoid. Each component is modulated separately with data, by shifting a phase of the component by 180 degrees.

The Costas loop is provided with two signal channels, an I channel and a Q channel. The input signal is split between the two channels with the inphase signal component being extracted by the I channel, and the quadrature signal component being extracted by the Q channel. The two channels provide signals which are combined to provide a loop error signal for driving a voltage controlled oscillator (VCO). The VCO outputs a carrier reference signal for demodulation of the sinusoidal components of the composite input signal. A phase shifter is employed at an output terminal of the oscillator to provide both inphase and quadrature reference carrier signals for use by the I and the Q channels.

The foregoing form of demodulator provides satisfactory operation in the usual situation wherein the inphase and the quadrature signal components are truly orthogonal, that is, wherein the sinusoidal components are shifted in phase by 90 degrees relative to each other. However, there are situations wherein the source of the composite input signal may be somewhat imperfect resulting in the production of a composite signal wherein the two components deviate in their orthogonality. For example, if such a defective composite signal is applied to the foregoing Costas loop, it is observed that it is impossible to align the inphase and the quadrature reference carrier signals with the components of the composite input signal. As a result, some crosstalk is observed in the demodulated signals extracted from the I and the Q channels of the demodulator. The crosstalk is undesirable, and tends to degrade the fidelity of the received data signals.

SUMMARY OF THE INVENTION

The aforementioned problem is overcome and other advantages are provided for a system employing orthogonal signal channels with carrier regeneration for the signal channels by introduction of quadrature compensated carrier reference signals. The quadrature compensation provides for adjustment of a phase offset between the carrier reference signals applied to orthogonal signal channels to maintain a desired cophasal relationship between a carrier reference and a corresponding signal component in each of the orthogonal signal channels. The foregoing operation of the invention is independent of the manner in which the carrier is regenerated. For example, the carrier can be regenerated by a process including a squaring of an input signal in the case of a two-phase signal, or by use of a second squaring to provide the fourth power of the input signal in the case of a four-phase signal. by way of further example, the carrier can be regenerated by cross multiplication of inphase and quadrature signal channels, as is accomplished in well-known fashion in a Costas loop. The invention is particularly useful for reduction of crosstalk in systems wherein there is a cross multiplication of signals of the orthogonal channels, such as in a Costas loop QPSK demodulator.

The principles of the invention are demonstrated, in the case of a preferred embodiment of the invention, for a Costas loop demodulator wherein a signal of each data channel is multiplied by the signal of the other channel, this being a cross channel multiplication, to produce a product for each channel which serves as an output signal for each channel. The output signals of the two channels are subtracted from each other to provide a loop error signal for control of a VCO for regeneration of a carrier to serve as a reference for demodulating each of the two orthogonal signals. The carrier is applied to a phase-offset device to provide two carrier reference signals which are offset from each other by a nominal value of 90 degrees, the offset carrier reference signals being applied to respective ones of the channels.

In accordance with the invention, the phase-offset device is automatically adjusted by a further loop of the system, a compensation loop, to adjust the amount of phase offset between the two reference carriers in correspondence with an amount of phase deviation from true orthogonality of the respective carriers of the two orthogonal signals of the composite signal applied to an input terminal of the Costas loop. The compensation loop is implemented by summing together the output product signals of the two channels to develop a phase correction signal which commands the phase-offset device to alter the phase offset from its nominal value of 90 degrees in accordance with the aforementioned phase deviation from orthogonality of the inphase and the quadrature signals.

In the case wherein the two signal carriers are truly orthogonal, the summing together of the output product signals of the two channels provides for a fixed value of phase correction signal which commands the phase offset device to maintain a nominal value of phase offset. However, in the event that there is a deviation from true orthogonality, then each of the output product signals of the two channels includes an additional component, described mathematically in terms of multiplication of trigonometric terms, which varies in accordance with the amount of phase shift by which the two channels deviate from orthogonality. This additional component causes the phase correction signal to vary in value based on the deviation from orthogonality.

In the preferred embodiment of the invention, the phase-offset device is constructed as a microwave circuit comprising a 90 degree hybrid unit, a voltage controlled attenuator (VCA), a power divider, and a delay line. The hybrid unit has a main input port and an auxiliary input port (the latter usually referred to as an isolated port). The power divider applies input power to both of the input ports with a relatively large fraction of the power being applied to the main input port and a relatively small fraction of the power being applied to the auxiliary input port. The power divider is connected directly to the main input port, and is coupled via the VCA to the auxiliary input port. The VCA includes a control terminal for receipt of the phase-correction command signal. The hybrid device includes two output ports, each of which outputs one-half of the power inputted at the main input port and, wherein, a first of the output ports introduces a 90 degree phase lag and a second of the output ports introduces a 180 degree phase lag relative to the phase of the signal inputted at the main input port.

The delay unit is located at the second output port of the hybrid unit to provide for an optional amount of fixed delay between the signals outputted by the hybrid unit. For a specific carrier frequency of the signals in the hybrid unit, the delay unit introduces a corresponding phase shift, proportional to the product of carrier frequency and the delay between the signals outputted by the hybrid unit for the following reason. A true ninety-degree phase shift is obtained between the output terminals of the hybrid unit for the case wherein no signal is applied to the auxiliary input terminal. However, application of signals to both input terminals of the hybrid unit, even though the auxiliary input signal be much smaller than the main input signal, introduces a phase offset from the desired nominal value of ninety degrees between the two output signal of the hybrid unit. The phase offset is adjustable over a range of values phase shift about the nominal value of phase offset. The delay unit is operative to cancel the nominal value of phase offset so as to restore the desired nominal value of ninety degrees.

The two signals outputted by the hybrid unit are applied to respective ones of the data channels of the Costas loop. The relatively small signal inputted at the auxiliary input port of the hybrid unit has the effect of altering the amount of phase offset between the two output ports of the hybrid unit. The amount of the offset depends on the relative magnitudes of the signals inputted at the two input ports of the hybrid unit. Alteration of attenuation of the VCA by the phase-correction command signal changes the relative magnitudes of the two input signals to the hybrid unit with a consequent shift in the value of the phase offset between the two carrier reference signals outputted by the hybrid unit to the data channels. This provides for full compensation of deviation of the input signal channels from orthogonality.

BRIEF DESCRIPTION OF THE DRAWING

The aforementioned aspects and other features of the invention are explained in the following description, taken in connection with the accompanying drawing, wherein the sole FIGURE shows circuitry of a Costas loop QPSK demodulator which has been modified, in accordance with the invention, to include an adjustable phase offset unit for producing phase-corrected carrier reference signals.

DETAILED DESCRIPTION

Figure 1:
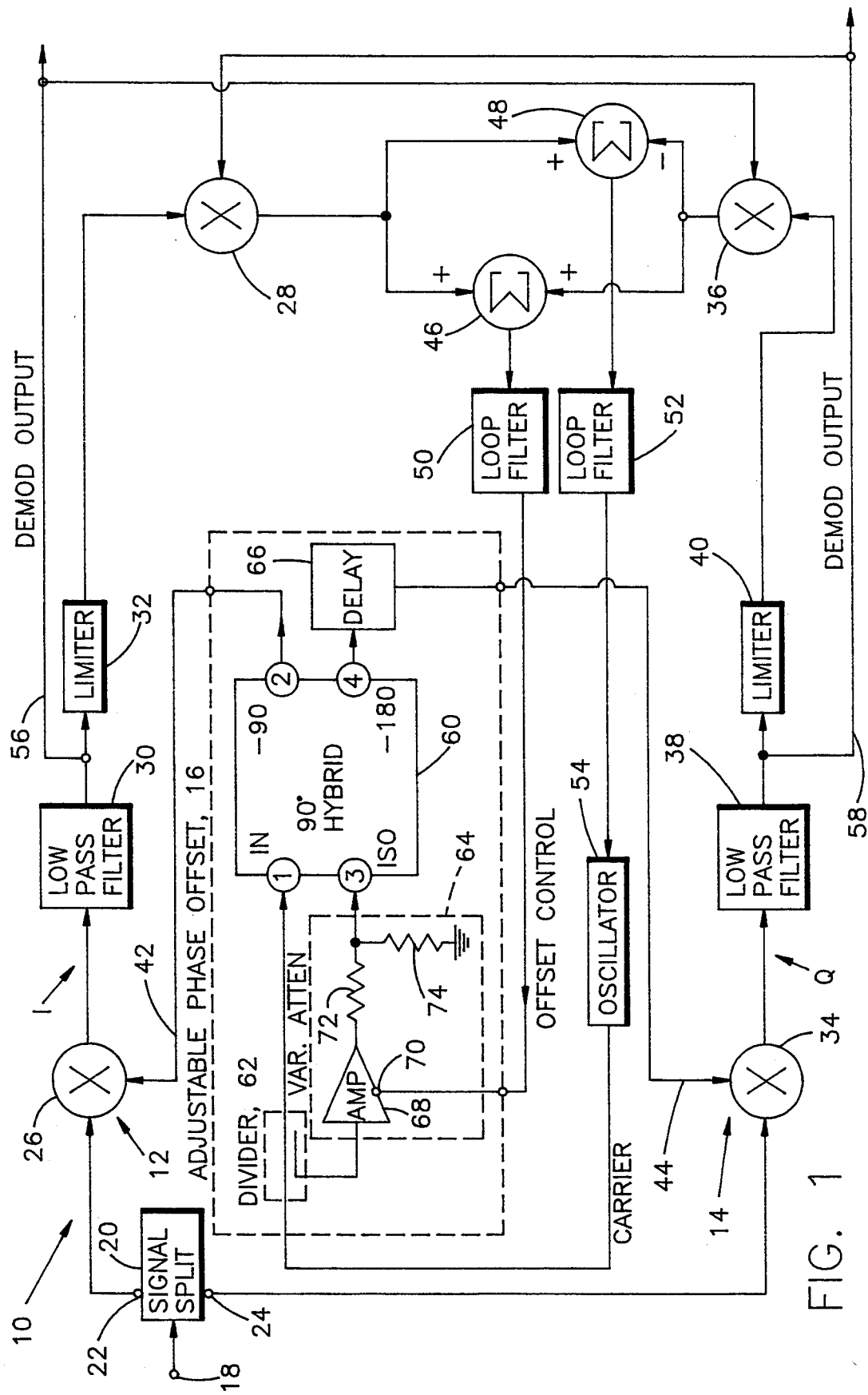

With reference to the FIGURE, there is shown a system 10 for generation of carrier reference signals for operation with inphase (I) and quadrature (Q) data channels 12 and 14, such as that employed in a Costas loop QPSK demodulator, the system 10 further comprising an adjustable phase-offset unit 16 operative in accordance with the invention for providing inphase and quadrature reference carrier signals. In the preferred embodiment of the invention, the system 10 is operative with microwave signals at a carrier frequency of approximately 370 megahertz (MHz). The composite input signal at a system input terminal 18 includes a sinusoidal component and a cosinusoidal component wherein each component may be modulated separately with a data signal. For example, the data signal may be a digital signal wherein a logic state of 0 is represented by a phase shift of zero degrees and a logic state of 1 is represented by a phase shift of 180 degrees. The composite input signal at terminal 18 is applied via a signal splitter 20 to both of the channels 12 and 14. By way of example, the signal splitter 20 may be constructed as a hybrid microwave unit having zero degrees of phase shift between the two output ports 22 and 24 of the splitter 20.

The inphase data channel 12 comprises a first multiplier operative as a phase detector 26, a second multiplier 28, a low-pass filter 30 and a signal amplitude limiter 32. Similarly, the quadrature data channel 14 comprises a first multiplier operative as a phase detector 34, a second multiplier 36, a low-pass filter 38 and a signal amplitude limiter 40. An inphase carrier reference signal is provided to the phase detector 26 via line 42 from the phase-offset unit 16, and a quadrature carrier reference signal is provided to the phase detector 34 via line 44 from the phase-offset unit 16. The system 10 further comprises two summers 46 and 48, two loop filters 50 and 52, and a voltage-controllable oscillator (VCO) 54.

There are two parts to the operation of the system 10. In the first part of the operation, the system 10 operates in a manner analogous to that disclosed in the aforementioned U.S. Pat. No. 4,344,178 wherein the phase detectors 26 and 34 effectively multiply the components of the composite signal by the quadrature carrier reference signals on lines 42 and 44, respectively, to produce product signals which are filtered by the filters 30 and 38, respectively, to produce base band I and Q demodulated output signals on lines 56 and 58, respectively. Since, in each of the channels 12 and 14, the carrier reference signal is in phase with only one of the components of the input signal, and in quadrature with the other of the two components, the detector 26 and the filter 30 serve to output only the I data while the detector 34 and the filter 38 serve to output only the Q data. The filters 30 and 38 remove high-frequency components of the multiplication operation from the outputted data. The signals on line 56 and 58 are applied via the limiters 32 and 40, respectively, to provide sign inputs to the multipliers 28 and 36. The I data on line 56 is also applied to the Q channel multiplier 36 to provide a cross-channel multiplication and, similarly, the Q data on line 58 is applied to the I channel multiplier 28 to provide a cross-channel multiplication.

The summer 48 provides for a subtraction of a signal outputted by the multiplier 36 from a signal outputted by the multiplier 28 to form a difference signal which is filtered by the filter 52 and applied as a control signal to the oscillator 54. The oscillator 54 outputs a carrier signal to the phase-offset unit 16 which divides the carrier signal into the two reference signals on lines 42 and 44, the two reference signals having the same frequency as the carrier outputted by the oscillator 54, but differing in phase by a nominal value of 90 degrees. The dynamic response time of the loop control of the oscillator 54 is determined by the bandwidth of the filter 52 in well-known fashion.

In the second part of the operation, and in accordance with the invention, the summer 46 is operative to sum the output signals of the multipliers 28 and 36 to provide a sum signal which is applied via the loop filter 50 as a phase-offset command for commanding the phase-offset unit 16 to provide a specific amount of phase offset between the carrier reference signals on lines 42 add 44. The specific circuitry employed in construction of the adjustable phase-offset unit 16 depends on the value of the carrier frequency. For example, at frequencies on the order of a few megahertz, the adjustable phase-offset unit 16 comprises a 90 degree hybrid unit 60, a power divider 62, a voltage-controllable variable attenuator (VCA) 64 and a delay unit 66. The attenuator 64 can be constructed of a well-known circuit, such as an amplifier 68 having a variable gain which is determined by a magnitude of voltage applied to a gain-control terminal 70. An output signal of the amplifier 68 is scaled to a desired value by a resistive voltage divider comprising resistors 72 and 74. The voltage divider is connected between an output terminal of the amplifier 68 and ground, with a scaled output signal being provided from the junction of resistors 72 and 74 to the hybrid unit 60. At higher frequencies, such as at several hundred megahertz, the hybrid unit 60 is a microwave hybrid unit, and the VCA 64 is constructed of a PIN diode (not shown) wherein a bias current is adjusted for attaining a desired amplitude to the signal outputted by the VCA 60.

The hybrid unit 60 is described in terms of S parameters by the following matrix:

$$S = \begin{bmatrix} 0 & \frac{-j}{\sqrt{2}} & 0 & \frac{-1}{\sqrt{2}} \\ \frac{-j}{\sqrt{2}} & 0 & \frac{-1}{\sqrt{2}} & 0 \\ 0 & \frac{-1}{\sqrt{2}} & 0 & \frac{-j}{\sqrt{2}} \\ \frac{-1}{\sqrt{2}} & 0 & \frac{-j}{\sqrt{2}} & 0 \end{bmatrix}$$

As shown in the FIGURE, the hybrid unit 60 has four ports numbered 1-4 which correspond to the arrangement of the rows and the columns of the foregoing matrix. The first port is the main input port. The second port is an output port providing half of the input power with a phase lag of 90 degrees. The third port is the isolated port which serves as an auxiliary input port. The fourth port is an output port providing half of the inputted power at a phase lag of 180 degrees.

In the operation of the phase-offset unit 16, carrier power from an oscillator 54 is applied via the divider 62 to the main input port of the hybrid unit 60 with a relatively small fraction of the power being diverted by the divider 62 for application via the attenuator 64 to the auxiliary input port of the hybrid unit 60. The amount of attenuation provided by the attenuator 64 is adjusted, as described hereinabove, by the magnitude of the offset control signal at terminal 70. The signal outputted by the second port of the hybrid unit 60 is applied via line 42 as the aforementioned inphase reference to the detector 26, and the signal outputted by the fourth port of the hybrid unit 60 is applied via the delay unit 66 and the line 44 as the aforementioned quadrature reference to the detector 34. At microwave frequencies, the delay unit 66 can be fabricated as simply a length of coaxial cable. For example, at a carrier frequency of 360 MHz, a length of two inches of coaxial cable provides a phase shift of approximately 30 degrees. The loop filter 50 may be, by way of example, an RC filter (such as that provided by the well-known configuration of an operational amplifier) with a resistor and a capacitor in a feedback loop around the amplifier. By way of example, the loop filter 50 may have a single pole and a cut-off frequency of one kilohertz. Each of the multipliers 26, 28, 34, and 36 may be constructed in the well-known form of a diode bride connected between input and output transformer windings.

The shift in phase from the nominal value of 90 degrees between the two carrier reference signals depends on the ratio of the signal power inputted at the auxiliary input port of the hybrid unit 60 to the signal power inputted at the main input port of the hybrid unit 60. The power ratio is controlled by operation of the VCA 64 to attain the phase compensation to the inphase and the quadrature channels. For example, a power ratio of approximately $-20$ dB (decibels) is attained in the situation wherein the amplitude of the auxiliary input signal is only one tenth the amplitude of the main input signal at the hybrid unit 60, and provides phase shift on the order of approximately 11.4 degrees. Operation of the phase-offset unit 16 may be explained mathematically as follows.

The signal outputted by the oscillator 54 is given by $$\sin(\omega t + \psi)$$

wherein $\omega$ is radian frequency, t is time, and $\psi$ is a phase angle. The signal applied to the first port of the hybrid unit 60 is given by $$\beta \sin(wt)$$

wherein $\beta$ is amplitude and represents a relatively small attenuation experienced by the signal propagating through the divider 62. The signal applied to the third port of the hybrid unit 60 is given by $$\alpha \sin(\omega t - \Theta)$$

wherein $\Theta$ is phase angle of the third-port signal relative to the first-port signal, and $\alpha$ is amplitude and represents attenuation produced by the divider 62 and the attenuator 64. The signal outputted by the second port of the hybrid unit 60 is given by $$\frac{1}{\sqrt{2}}\left\{\beta\sin\left(wt-\frac{\pi}{2}\right)+\alpha\sin(wt-\theta-\pi)\right\}=$$

$$\frac{-1}{\sqrt{2}}\sqrt{\beta^2-2\alpha\beta\sin\theta+\alpha^2}\cos(wt-\phi_1)$$

wherein the phase offset $\phi_1$ is given by $$\phi_1=\tan^{-1}\left(\frac{\alpha\cos\theta}{\beta-\alpha\sin\theta}\right)$$

The signal outputted by the hybrid unit 60 at its fourth port is given by $$\frac{1}{\sqrt{2}}\left\{\beta\sin(wt-\pi)+\alpha\sin\left(wt-\theta-\frac{\pi}{2}\right)\right\}=$$

$$\frac{-1}{\sqrt{2}}\sqrt{\beta^2-2\alpha\beta\sin\theta+\alpha^2}\cos(wt-\phi_2)$$

wherein the phase offset $\phi_2$ is given by $$\phi_2=\tan^{-1}\left(\frac{\alpha\cos\theta}{\beta-\alpha\sin\theta}\right)$$

at the output terminal of the delay unit 66, the phase offset is given by $$\phi_2=\tan^{-1}\left(\frac{\alpha\cos\theta}{\beta+\alpha\sin\theta}\right)-\omega T_d$$

wherein $T_d$ is the delay time.

As shown by the foregoing mathematical explanation, a change in the offset control voltage applied to the offset unit 16 is operative to provide a change in the amount of phase offset between the reference signals on lines 42 and 44. This is accomplished independently of the loop controlling the oscillator 54. Thereby, the invention is operative with a Costas loop QPSK demodulator to provide improved detection of the I and Q data by elimination of crosstalk caused by a lack of orthogonality between the I and the Q components of the composite input signal to the system 10.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a system for generation of a carrier for operation with inphase and quadrature data channels, the system comprising:

an inphase data channel and a quadrature data channel, each of said channels including a first multiplying means, a second multiplying means, and a limiter of signal amplitude interconnecting an output port of said first multiplying means with a first input port of said second multiplying means, said first multiplying means in each channel having an input port for receiving a composite input data signal having orthogonal components;

an oscillator outputting a reference carrier, and a variable phase offset means for coupling the carrier from said oscillator to each of said data channels, said first multiplying means in each of said channels having a second input port for receiving the carrier from said variable phase offset means, said variable phase offset means outputting inphase and quadrature components of said carrier differing in phase from each other by a nominal value of ninety degrees, the carrier inphase component being applied to said first multiplying means of said inphase channel and the carrier quadrature component being applied to said first multiplying means of said quadrature channel;

wherein, in said inphase channel, said second multiplying means multiplies together output signals of said limiter of said inphase channel and said first multiplying means of said quadrature channel to provide an inphase channel output signal and, in said quadrature channel, said second multiplying means multiplies together output signals of said limiter of said quadrature channel and said first multiplying means of said inphase channel to provide a quadrature channel output signal;

said system further comprises a first summing means for extracting a difference between the channel output signals to provide a control signal for said oscillator to establish a frequency of the carrier outputted by said oscillator; and a second summing means for summing together the channel output signals to provide a command signal for said variable phase offset means to adjust the phase difference between the carrier components by shifting the phase difference away from ninety degrees, thereby to compensate for a deviation in orthogonality of the components of the input data signal.

2. A system according to claim 1 wherein said first multiplying means in each of said channels includes a multiplying element and a low-pass filter at an output port of the multiplying element, said first multiplying means functioning as a phase detector.

3. A system according to claim 2 wherein in any one of said channels, there is connection between said limiter and said low-pass filter; and an output port of said first summing means includes a low-pass filter applying the control signal to said oscillator.

4. In a system for generation of a carrier for operation with inphase and quadrature data channels, the system comprising:

an inphase data channel and a quadrature data channel, each of said channels including a first multiplying means, a second multiplying means, and a limiter of signal amplitude interconnecting an output port of said first multiplying means with a first input port of said second multiplying means, said first multiplying means in each channel having an input port for receiving a composite input data signal having orthogonal components;

an oscillator outputting a reference carrier, and a variable phase offset means for coupling the carrier from said oscillator to each of said data channels, said first multiplying means in each of said channels having a second input port for receiving the carrier from said variable phase offset means, said variable phase offset means outputting inphase and quadrature components of said carrier differing in phase from each other by a nominal value of ninety degrees, the carrier inphase component being applied to said first multiplying means of said inphase channel and the carrier quadrature component being applied to said first multiplying means of said quadrature channel;

wherein, in said inphase channel, said second multiplying means multiplies together output signals of said limiter of said inphase channel and said first multiplying means of said quadrature channel to provide an inphase channel output signal and, in said quadrature channel, said second multiplying means multiplies together output signals of said limiter of said quadrature channel and said first multiplying means of said inphase channel to provide a quadrature channel output signal;

said system further comprises a first summing means for extracting a difference between the channel output signals to provide a control signal for said oscillator to establish a frequency of the carrier outputted by said oscillator;

a second summing means for summing together the channel output signals to provide a command signal for said variable phase offset means to adjust the phase difference between the carrier components, thereby to compensate for a deviation in orthogonality of the components of the input data signal; and said variable phase offset means comprises a quadrature hybrid unit which includes a first port serving as a primary input port, a second port serving as an output port which provides one-half of power present at said first port with a phase lag of ninety degrees, a third port serving as an auxiliary input port, and a fourth port serving as a further output port providing one-half of power present at said first port with a phase lag of one hundred eighty degrees;

a power divider connecting a carrier input port of said variable phase offset means to said first and said third ports of said quadrature hybrid unit, said power divider applying a relatively large fraction of carrier power from said oscillator to said first port of said quadrature hybrid unit and a relatively small fraction of the carrier power to said third port of said quadrature hybrid unit; and a variable attenuator interconnecting said power divider with said third port of said quadrature hybrid unit, said attenuator having circuitry for varying attenuation of a signal applied to said third port of said quadrature hybrid unit in accordance with the command signal of said second summing means, said second port of said quadrature hybrid unit outputting the inphase carrier component to said inphase channel, and said fourth port of said quadrature hybrid unit outputting the quadrature carrier component to said quadrature channel.

5. A system according to claim 4 wherein said variable phase hybrid means further comprises a delay line coupled to the fourth port of said quadrature hybrid unit to provide a fixed phase shift between said inphase and quadrature carrier components; and wherein an output port of said second summing means is provided with a low-pass filter for applying said command signal to said variable attenuator.

* * * * *